Patented Apr. 17, 1934

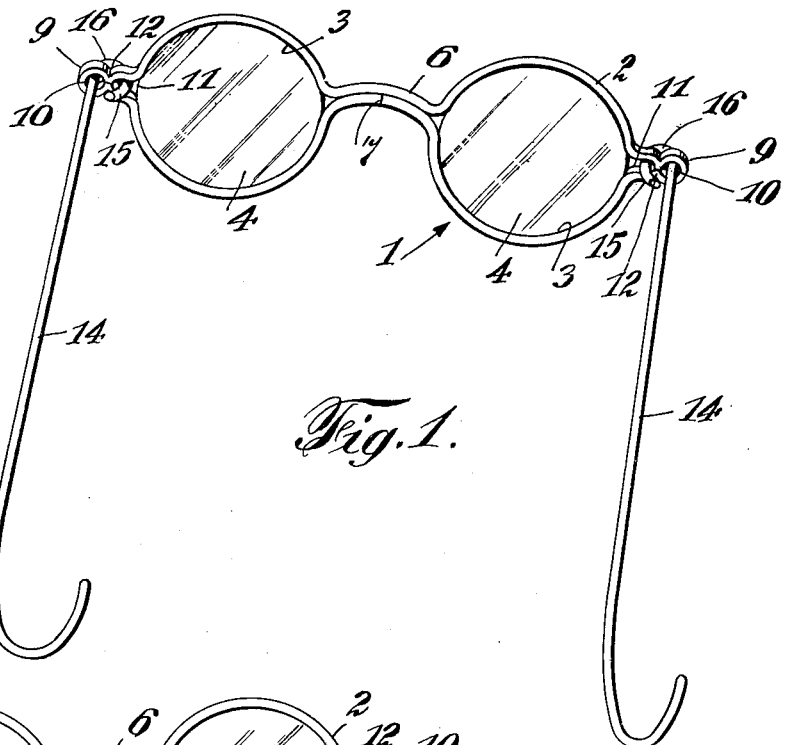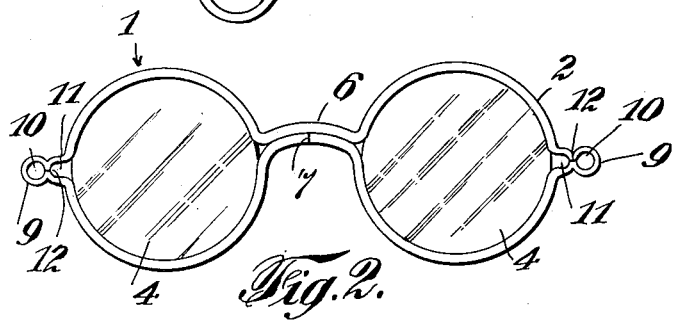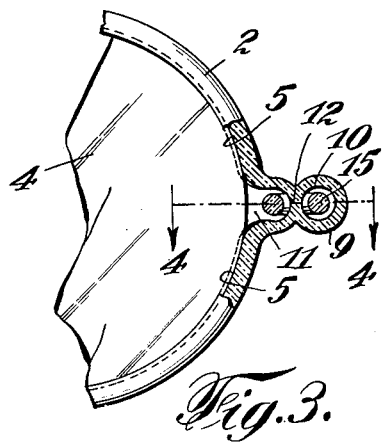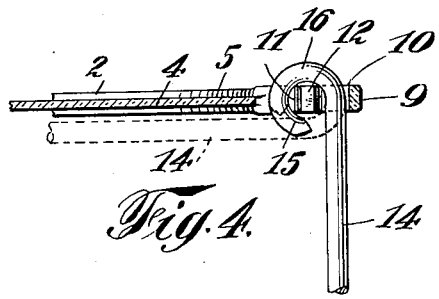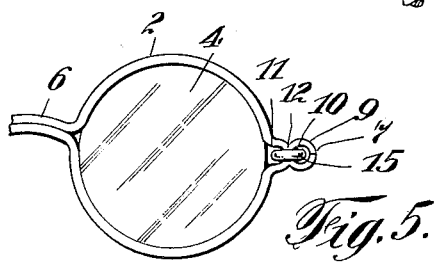

1,955,690

UNITED STATES PATENT OFFICE 1,955,690

GLASSES AND THE LIKE

Fred Spill, East Rutherford, N. J., assignor to Spill Manufacturing Co., Inc., East Rutherford, N. J., a corporation of New Jersey Application September 19, 1931, Serial No. 563,705

13 Claims. (Cl. 88—53)

The present invention relates generally to eye glasses, and more particularly to inexpensive sun glasses and the like.

Sun glasses are particularly useful for protecting the eyes when exposed to the sun or bright lights. For example, they are restful to the eyes in driving motor cars and the like, or at the beach where the reflection of the sun upon the water causes an annoying glare. In addition, sun glasses are sold extensively as toys for children. Glasses sold for these purposes must necessarily be inexpensive to be popular. In fact, they are sold in such large quantities through syndicate stores, that a saving of a few cents a gross in the manufacturing cost is the difference between success and failure in the sale of the article. A substantial part of the cost of such articles is the labor required to shape and assemble the parts. It has been customary to make the frames of a single piece of material (see patent, No. 1,739,696), and to secure the temples to extensions at the sides of the frames by means of small rivets or the like. The mounting of the temples on the frame by means of rivets is a relatively expensive operation which requires considerable time. The present invention aims to form a secure lock by co-operating configurations of the extension at the end of the temples, without the use of rivets of any kind. This not only provides a secure mounting for these parts, but substantially reduces the cost of the glasses due to the decrease in time required to assemble the temples and the frame in this novel manner.

An object of the present invention is to decrease the cost of manufacture, without impairing the quality of usefulness of sun glasses and the like.

Another object of the invention is to simplify the manufacturing and assembling operations in making sun glasses.

Another object of the invention is to improve the means of mounting temples on sun glasses and to reduce the cost of performing this operation.

Another object of the invention is to provide an extension at the sides of the frame to which a temple may be mounted without requiring rivets, pins or other devices for holding the two parts together.

Another object of the invention is to eliminate the use of rivets or pins in the manufacture of sun glasses and the like.

Another object of the invention is to secure a temple to the frame of the glasses by interlocking the parts thereof.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein Fig. 1 is a perspective view showing a preferred embodiment of the invention;

Fig. 2 is a front elevational view of the frame for the glasses before the application of the temples;

Fig. 3 is a sectional view illustrating the details of the attachment of the temples to the glasses;

Fig. 4 is a sectional view, along the line 4—4 of Fig. 3; and

Fig. 5 is a front elevational view of a portion of the frame, illustrating a slightly different frame construction and the application of the present invention thereto.

Referring again to the drawing, there is shown a spectacle frame 1, preferably formed from a single strip of material 2, which is bent to provide a pair of apertures 3 adapted to receive lenses or transparent discs 4. The discs 4 are seated at the periphery thereof in suitable grooves 5 provided in the strip 2, whereby they are rigidly assembled with respect to the frame. The central portion of the strip 2 is pressed together intermediate the lens apertures to form the nose bridge 6. Preferably, the ends of the strip 2 meet at the nose bridge, as indicated at 7. However, the ends may be joined or may meet at other portions of the frame. While any convenient means may be utilized for making the sun glasses described herein, without deviating from the invention, the preferred method of making is illustrated in Patent No. 1,739,696.

The present invention differs from established practices and from known forms of glasses in the means and method of attaching the temples to the frames for the glasses. It has been customary, heretofore, to form an aperture at the sides of the frame, to extend the ends of the temples through the aperture, and to secure the end of the temple in the aperture by means of a pin or rivet. The present embodiment of the invention contemplates the provision of an extension 9 at each side of the spectacle frame, by forming a loop in the strip 2 of material utilized for the frame. This extension 9 is firmly pressed together substantially at its center to provide a plurality of apertures, here shown as two in number, through which the temple may be passed. The outer aperture 10 is completely circumvented by the portions 9 of the strip 2, but, preferably, the inner aperture 11 is substantially U-shaped, with the edge of the transparent lens 4 closing the open portion of the U. This leaves the portion 11 of the U open prior to the assembly of the lens. The central portion 12 is pressed together to separate the apertures 10 and 11, and, if desired, suitable adhesive or heat may be utilized for securing the parts together to prevent separation thereof.

A temple 14 is then provided, preferably of celluloid or the like, which may be readily molded and shaped when in a warm condition. The end 15 of the temple 14 is warmed slightly to permit bending thereof and is then passed through the outer aperture 10 and bent, as shown at 16, to pass in the opposite direction through the inner aperture 11, the free end 15 being bent further until it is substantially in engagement with the temple, thereby forming a loop about the central portion 12 of the extension. The size of the outer aperture 10 and of the separating partition 12 is preferably such that the temples can be moved outwardly about their pivoted ends to a limited extent, that is, substantially perpendicularly to the longitudinal plane of the frame. Since the apertures are substantially cylindrical, the loop portion 16 at the end of the temple limits the outward spreading of the temples because the bent portion engages the inside portion of the partition 12, and, in addition, the straight portion of the temples fit into the aperture 10 and engages the inner side of this aperture to prevent spreading of the temples. On the other hand, the temples may be folded inwardly, as is customary with glasses, without any difficulty, because the bent ends or loops 16 cooperate with the outer apertures 10 to facilitate rotation of the loops 16 about the portion 12. This is illustrated more particularly in Fig. 4, wherein the open position of the temple is shown in full lines and the folded position in dotted lines.

While the above embodiment is described as made from a single piece of material, it will be understood that certain features of the invention are applicable to frames made in other ways. Likewise, the above embodiment illustrates the frames having the ends of the strip meeting at the bridge part 6 thereof. The free ends of the strip 2 of the frame may be conveniently joined at any point; for example, at the ends of one of the extensions 9, as shown more particularly in Fig. 5.

In assembling the parts, the strip of material 2 may be bent into the form of the frame 1, leaving the extensions 9 protruding. Pressure is applied to these extensions to shape them into the form substantially similar to Fig. 2, leaving the two apertures 10 and 11 separated by the partition 12. The end 15 of the temple is preferably heated to make it moldable, inserted through the outer aperture 10, bent upon itself, and passed back through the inner aperture 11 in the opposite direction so that it is looped about the partition 12. By reason of the fact that the rounded portion of the end of the temple extends inwardly toward the frame, the temples may be folded together in the usual manner without difficulty, since the rounded end 16 permits ample clearance during the folding operation. The temples are prevented from being folded outwardly beyond substantially the perpendicular line, by the straight portion of the pivoted end of the temple which engages the sides of the outer aperture 10, and the rounded portion 16 acts in substantially the same manner to lock the temples against outward movement beyond a substantially vertical plane. The bent portion of the temple may fit about the part 12 with sufficient tightness to suit the individual taste. In fact, by heating it slightly, the salesman may adjust the shape thereof to suit the individual customer's taste in this respect.

It will be seen that the present invention provides a very secure means for mounting temples on spectacle frames. The cost of assembling these parts is substantially less than the cost by practices heretofore, and breakage is minimized. In addition, adjustments may be made by the salesman to create sufficient friction between the parts to satisfy the individual customer's taste.

As various changes may be made in the form, construction and arrangement of parts without departing from the spirit and scope of the invention and without sacrificing its advantages, it is to be understood that all matter herein is to be interpreted as illustrative and not in a limiting sense.

Having thus described my invention, I claim:

1. In a device of the class described, the combination of a frame for glasses and the like having a pair of apertures at each side thereof, and a portion of the frame separating said apertures, and a temple mounted in each of said pairs of apertures by having one end thereof bent to extend through the pair of apertures to form a loop about the portion of the frame separating said apertures.

2. In a device of the class described, the combination of a frame for glasses and the like, formed from a single strip of material, extensions formed in said strip of material at the ends of the frame, said extensions being substantially in the form of a figure eight so that two apertures and an intermediate portion are presented, and temples having one end thereof bent upon itself to extend through both of the apertures in said extensions, and to form a loop about the portions of the extensions separating the two apertures.

3. As an article of manufacture, a frame for glasses and the like formed from a single strip of moldable material, the respective ends of said strip of material meeting and being joined together at the bridge of the frame, extensions at the sides of the frame, the central portion of the extension being pressed together to form a pair of apertures in each extension.

4. In a frame for glasses and the like, the combination of a frame formed of thermo-plastic material, extensions at the sides of the frame having a pair of apertures therein, a portion integral with said extension separating said apertures, and a temple of like material having one end thereof extending through one of said apertures in one direction and through the other of said apertures in the opposite direction to form a loop about the portion of the extension separating said apertures and to securely mount the temple.

5. As an article of manufacture, a frame for glasses and the like formed of a single strip of material, an extension formed at one side of said frame, said extension having a vertical portion integral with said frame and a portion providing an aperture spaced outwardly from said vertical portion, and a temple extending through said aperture and secured to said vertical portion by having its end bent thereabout partly about said vertical portion to form an open loop.

6. The method of attaching a temple formed of a thermo-plastic material to a frame for glasses having an extension at the side of the frame substantially in the form of a figure eight, to provide a pair of apertures and a central portion, which method comprises softening and extending the end of the temple through the outer aperture, and bending the softened end of the temple and extending it through the inner aperture to form a loop about the central portion of the extension and permitting said softened end to set whereby the temple is secured to said extension.

7. The method of attaching a temple to frames for glasses having a pair of apertures at the ends thereof, which method comprises softening one end of the temple, extending said end of the temple through one of said apertures, and bending said end to extend through the other aperture in the opposite direction whereby the temple is mounted about the portion of the frame separating the two apertures.

8. In a device of the class described, the combination of a frame for glasses and the like formed from a single piece of material and having a pair of laterally adjacent apertures formed therefrom at the end thereof, and a normally rigid temple mounted upon said frame by having one end thereof extending through both of said apertures.

9. As an article of manufacture, a frame for glasses and the like having a pair of upper and lower arcuate portions at the side thereof and substantially straight portions intermediate said respective arcuate portions, said straight portions being joined together to provide a pair of apertures for connecting a temple to said frame, the end of said temple extending through both of said apertures.

10. As an article of manufacture, a frame for glasses formed from a single elongated strip of celluloid material, extensions formed in said strip at the sides of the frames having a pair of apertures therein adapted to receive the ends of temples, and upper and lower abutting portions between said apertures joined together to provide for the temples.

11. A frame for glasses and the like, formed from a single strip of celluloid material and the like, portions formed from said strip of material extending laterally outwardly at the ends of the frame, said portions being substantially in the form of a horizontally extending figure eight so that two apertures are presented, said extending portions being joined together between said apertures to provide means for connecting a temple thereto.

12. In a device of the class described, the combination of a frame for glasses formed from a single strip of material, extensions formed in said strip at the sides of the frame, each extension having an aperture therein adapted to receive a temple and a pivot portion spaced inwardly from the aperture and a temple in each of said extensions having its end bent upon itself to extend through said aperture and looped about said pivot portion, said temple having the end thereof abutting against said pivot portion to limit the movement of said temple.

13. In a device of the class described, the combination of a frame for glasses having an extension at one side of the frame, said extension being provided with a pair of apertures and a portion separating said apertures, and a temple extending through one of said apertures in one direction and pivoted to the portion separating the apertures and extending through the other aperture in the opposite direction.

FRED SPILL.